(12) United States Patent
Fu et al.

(10) Patent No.: US 7,024,755 B2
(45) Date of Patent: Apr. 11, 2006

(54) METHOD BALANCING A DISK PACK IN A HARD DISK DRIVE

(75) Inventors: Ta-Chang Fu, San Jose, CA (US); Stanley Yen Wong, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 259 days.

(21) Appl. No.: 10/650,881

(22) Filed: Aug. 28, 2003

(65) Prior Publication Data
US 2005/0047002 A1  Mar. 3, 2005

(51) Int. Cl.
*G11B 5/127* (2006.01)
*H04R 31/00* (2006.01)

(52) U.S. Cl. .............. 29/603.03; 29/603.04; 29/603.06; 310/51; 310/67 R; 310/91; 360/98.07; 360/99.04; 360/99.08; 360/97.01; 360/97.02; 360/97.04; 360/99.12

(58) Field of Classification Search .......... 29/603.03–603.06; 360/98.07, 99.04, 97.01–97.04, 360/99.05–99.12; 310/51, 67 R, 91
See application file for complete search history.

(56) References Cited
U.S. PATENT DOCUMENTS
5,555,144 A * 9/1996 Wood et al. ............. 360/98.08
5,731,928 A * 3/1998 Jabbari et al. ........... 360/98.08
6,608,733 B1 * 8/2003 Elsing .................... 360/99.08
6,807,721 B1 * 10/2004 Choo et al. .............. 29/603.03

FOREIGN PATENT DOCUMENTS
EP  348846 A2 *  1/1990

OTHER PUBLICATIONS
"Investigation of the effect of hard disk drive unbalance on repeatable and nonrepeatable runout"; Hredzak, B.; Guo, G.; Zhang, J.; Power Electronics and Drive Systems, 2003; Nov. 17-20, 2003 Page(s):1359-1363.*

* cited by examiner

*Primary Examiner*—A. Dexter Tugbang
*Assistant Examiner*—Paul D. Kim
(74) *Attorney, Agent, or Firm*—Bracewell & Giuliani LLP

(57) ABSTRACT

A method of using a balance clip in a hard disk drive spindle motor for disk pack balance correction provides the balance clip with one end that is offset from the circular shape of the balance clip. The offset end is located opposite the precise bent tab that provides tooling engagement in the balance clip. The offset end of the balance clip is offset at a radius that is less than the radius of the balance clip, or at a lesser radial offset from the circular shape. The edge of the offset end does not make contact with the groove in which the balance clip is seated. This design eliminates scratching between the offset end and motor hub, and reduces friction and particle generation during clip adjustment in the disk pack balancing process.

9 Claims, 3 Drawing Sheets

METHOD BALANCING A DISK PACK IN A HARD DISK DRIVE

BACKGROUND OF THE INVENTION

1. Technical Field

The present invention relates in general to an improved method of balancing hard disk drives and, in particular, to an improved method that uses an enhanced balance clip design for use in conjunction with the spindle motor for reducing friction during clip adjustment in the disk pack balance process.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each platter and flies just over the platter's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

During manufacturing of the hard disk drive, the subassembly of the spindle motor is fabricated and the disks are attached to a hub 11 (FIG. 1) of the spindle motor. In the prior art, the hubs 11 are formed from aluminum, and balance clips 13 are used in the hubs to fine-tune the balance of the hubs 11. As shown in FIG. 1, the balance clips 13 are retained on the hub 11 in balance clip holder features 15, which are typically integrally formed as part of the motor hub 11. Each balance clip 13 has a wire-like body that is formed in a semi-circular shape. Each balance clip 13 also has an integrally formed bent tab 17 on one end that is precisely formed in order to facilitate the balance correction process. Alternatively, the balance clips 13 sometimes comprise split rings.

In either case, an opposite end 19 (see FIG. 5) of each balance clip 13 is cut and forms a relatively sharp edge around the cross-section of the balance clip 13. As a result, movement of the balance clips 13 during the balancing process causes ends 19 to frictionally engage the inner surfaces of the holder features 15. Such contact between ends 19 and hub 11 can be significant and even prevents movement of the balance clip 13. Such contact between ends 19 and hub 11 can also scratch the motor hub groove surface, thereby generating particles and contamination during clip adjustment in the disk pack balancing process. It has been proposed that ends 19 be carefully polished, but such processing adds cost to the product. Although this solution is workable, an improved method that is more cost effective would be even more desirable.

SUMMARY OF THE INVENTION

One embodiment of a method for utilizing balance clips in a spindle motor to facilitate an improved disk pack balance correction is disclosed. The present invention incorporates a balance clip having one end that is offset from the circular shape of the wire body of the balance clip. The offset end is located opposite the precise bent tab that provides tooling engagement to the balance clip. The offset end of the balance clip is offset either at a radius that is less than the radii (the body of the balance clip can be formed at multiple radii of curvature) of the body of the balance clip, or by bending the end of the clip at a pre-determined distance radially inward around a tooling pin. Consequently, the cross-sectional edge of the clip at the offset end does not make contact with the surface of the groove in which the balance clip is seated. This design eliminates scratching between the offset end and motor hub, and thereby greatly reduces friction and particle generation during clip adjustment in the disk pack balancing process.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
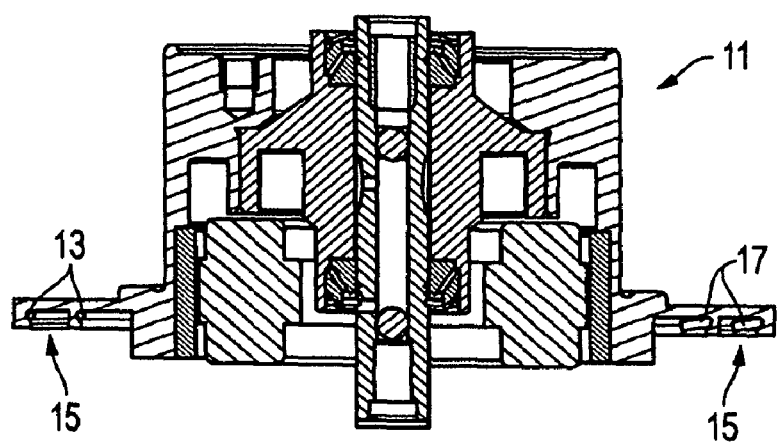
FIG. 1 is a sectional side view of a prior art spindle motor hub.
Figure 2:
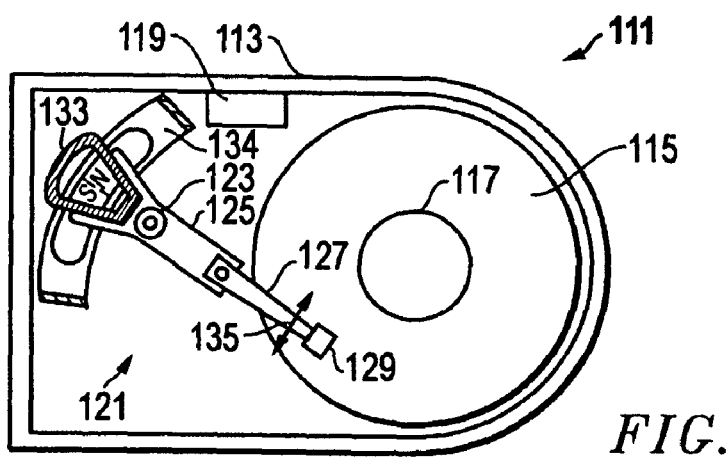
FIG. 2 is a schematic plan view of one embodiment of a hard disk drive constructed in accordance with the present invention.

Referring to FIG. 2, a schematic drawing of one embodiment of an information storage system comprising a magnetic hard disk file or drive 111 for a computer system is shown. Drive 111 has an outer housing or enclosure 113 containing at least one stacked, parallel magnetic disks 115, which are closely spaced apart. Disks 115 are rotated by a spindle motor assembly 116 (see FIG. 7) having a central drive hub 117. Spindle motor assembly 116 is merely one design of many that are compatible with the present invention. An actuator 121 comprises at least one actuator arm 125 in the form of a comb that is pivotally mounted to enclosure 113 about a pivot assembly 123. A controller 119 is also mounted to enclosure 113 for selectively moving the comb of arms 125 relative to disks 115.

In the embodiment shown, each arm 125 (FIG. 2) has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disks 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be femto size (approximately 850×700×230 microns) and is pre-loaded against the surface of disk 115 (in the range two to ten grams) by suspension 127.

Suspensions 127 have a spring-like quality, which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disks 115 until the heads settle on their respective target tracks. The head gimbal assemblies operate in a conventional manner and always move in unison with one another, unless drive 111 uses multiple independent actuators (not shown) wherein the arms can move independently of one another.

Figure 7:
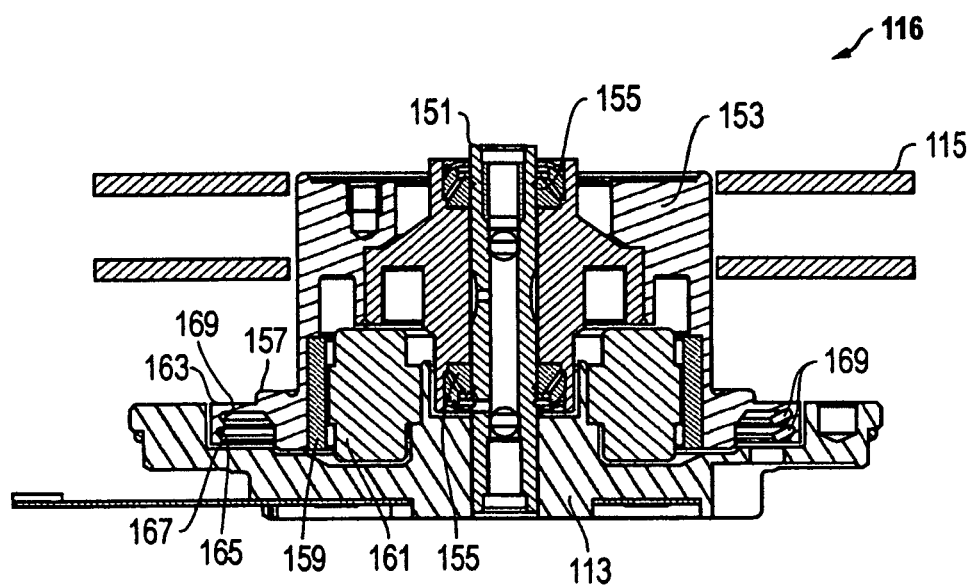
FIG. 7 is a sectional side view of the balance clip and spindle motor assembly of FIG. 6 and is constructed in accordance with the present invention.

As shown in FIG. 7, the spindle motor assembly 116 has a shaft 151 mounted to the base or enclosure 113. A motor hub 153 is mounted to the shaft 151 via bearings 155 for rotation relative to the shaft 151. The motor hub 153 also has an outer radial circumference 157 and a set of windings 159 for rotation relative to a stator 161 on the shaft 151. In the embodiment shown, a balance clip holder 163 is located on the outer radial circumference 157 of the motor hub 116. The balance clip holder 163 has, in the present embodiment, at least one annular recess 165 (two shown) formed on an inner surface 167 thereof that circumscribe the motor hub 153. The material of the balance clip holders 163 may comprise, but is not limited to, stainless steel, aluminum, etc.

Referring again to FIG. 7, at least one annular balance clip 169 (two shown) is located in and slidably mounted to one of the annular recesses 165 in the balance clip holder 163. In this way, the balance clip(s) 169 adjustably balance the motor hub 153 and the spindle motor assembly 116 for smooth rotation about the shaft 151 during the disk pack balance correction process.

Figure 3:
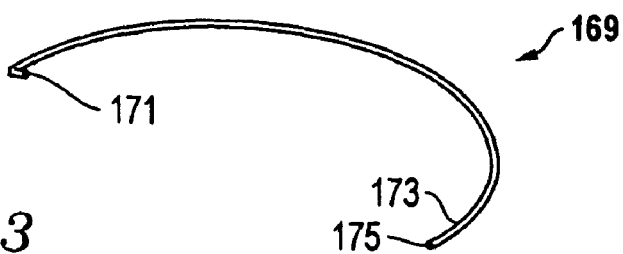
FIG. 3 is an isometric view of one embodiment of a balance clip constructed in accordance with the present invention.
Figure 4:
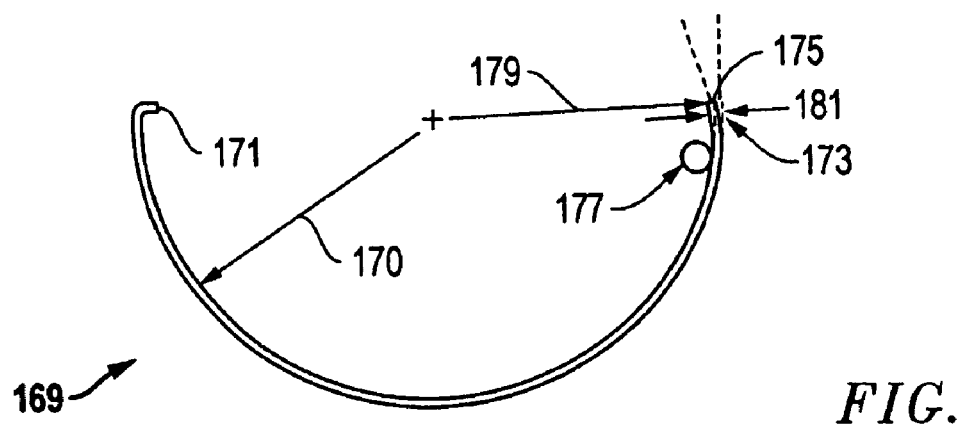
FIG. 4 is a top plan view of the balance clip of FIG. 3 during formation and is constructed in accordance with the present invention.

In the embodiment shown (FIGS. 3 and 4), the balance clip 169 is an annular wire with a semi-circular shape that may be composed of one radius 170 or several different radii. Alternatively, the balance clip 169 may comprise a split ring, if desired. The circular body of the balance clip 169 is formed with a bent tab 171 on one end and an offset bend 173 on the opposite end 175. The bent tab 171 facilitates the balance correction process. The offset bend 173 may be formed with a tooling pin 177 (FIG. 4) such that the end 175 is formed at a different radius 179 that is significantly smaller than the one radius or the several radii 170. Alternatively, end 175 may be bent at a desired distance 181 toward the center of the balance clip 169. In the embodiment shown, the offset bend 173 is formed immediately adjacent to the opposite end 175, or within about 0.6 mm of it. When force is applied radially inward to end 175, the tooling pin 177 is used to reorient offset bend 173 at the slight offset distance 181 of about 0.6 mm with respect to the body of balance clip 169.

Figure 5:
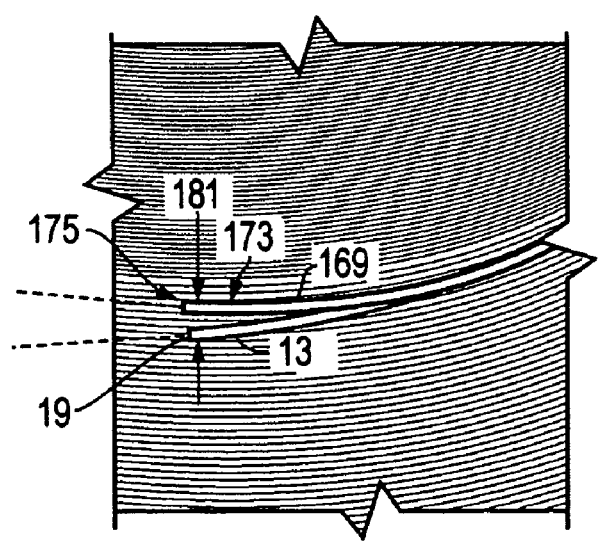
FIG. 5 is a top plan view of a pair of stacked balance clips comparing, on the top, the balance clip of FIG. 3 and, on the bottom, a prior art balance clip.
Figure 6:
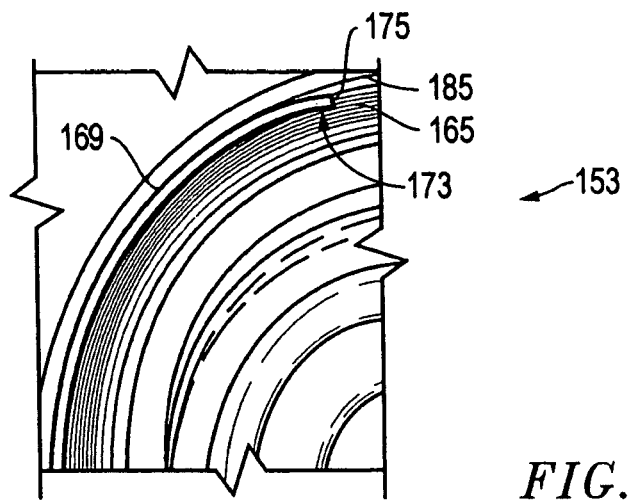
FIG. 6 is a bottom view of the balance clip of FIG. 3 installed in the hub of a spindle motor for a hard disk drive and is constructed in accordance with the present invention.

For comparison, FIG. 5 depicts balance clip 169 stacked on top of a conventional, prior art balance clip 13. When compared to the end 19 of prior art clip 13, the end 175 of balance clip 169 clearly illustrates the smaller radius 179 (FIG. 4) and offset distance 181 at which it is formed. Finally, in FIG. 6, the balance clip 169 is shown installed in the recess 165 of the hub 153. The end 175 of balance clip 169 does not make contact with the outer diameter wall 185 of the recess 165 or balance clip holder.

In operation, the method of the present invention comprises balancing a disk pack in a hard disk drive. The method comprises providing the hard disk drive with a motor hub, a balance clip holder in the motor hub, and a balance clip seated in the balance clip holder; providing a bent tab on one end of the balance clip to facilitate the disk pack balancing process; offsetting an opposite end of the balance clip relative to a body of the balance clip; and slidably moving the balance clip relative to the balance clip holder to adjustably balance the motor hub for smooth rotation during the disk pack balance process.

Alternatively, the offsetting step comprises forming the opposite end of the balance clip at a radius that is less than the radius (or radii) of the body of the balance clip, or at a selected distance. The offsetting step may also comprise locating an offset bend of the balance clip immediately adjacent to the opposite end of the body. During the slidably moving step, the opposite end of the balance clip is free of contact with an outer diameter wall of the balance clip holder.

The present invention has several advantages, including the ability to provide a hard disk drive with a smoothly adjustable balance clip to facilitate and improve the disk pack balance correction process. The invention incorporates a bent end on the balance clip so that the sharp, cut end of the clip is radially offset from the surface of the groove in which the clip is seated. In addition, this invented feature on the balance clip reduces friction and contamination during adjustment of the clips in the disk pack balance process.

While the invention has been shown or described in only some of its forms, it should be apparent to those skilled in the art that it is not so limited, but is susceptible to various changes without departing from the scope of the invention.

What is claimed is:

1. A method of balancing a disk pack in a hard disk drive, comprising:
   providing the hard disk drive with a motor hub, a balance clip holder in the motor hub, and a balance clip seated in the balance clip holder;
   providing a bent tab on one end of the balance clip to facilitate the disk pack balancing process;
   offsetting an opposite end of the balance clip relative to a body of the balance clip such that the opposite end is free of contact with the balance clip holder; and
   slidably moving the balance clip relative to the balance clip holder to adjustably balance the motor hub for smooth rotation during the disk pack balance process.

2. The method of claim 1, wherein the offsetting step comprises forming the opposite end of the balance clip at a radius that is less than a radius of the body of the balance clip.

3. The method of claim 1, wherein the offsetting step comprises forming the opposite end of the balance clip at a pre-determined lesser radial distance with respect to the body of the balance clip.

4. The method of claim 1, wherein the offsetting step comprises locating an offset bend of the balance clip immediately adjacent to the opposite end of the body.

5. The method of claim 1, wherein, during the slidably moving step, the opposite end of the balance clip is free of contact with an outer diameter wall of the balance clip holder.

6. A method of balancing a disk pack in a hard disk drive, comprising:
   providing the hard disk drive with a motor hub, a balance clip bolder in the motor hub, and a balance clip seated in the balance clip holder;
   providing a bent tab on one end of the balance clip to facilitate the disk pack balancing process;
   offsetting an opposite end of the balance clip radially inward relative to a diameter a body of the balance clip such that an offset bend of the balance clip is located immediately adjacent to the apposite end of the body; and
   slidably moving the balance clip relative to the balance clip holder to adjustably balance the motor hub for smooth rotation during the disk pack balance process, such tat the opposite end of the balance clip is free of contact with an outer diameter wall of the balance clip holder.

7. The method of claim 6, wherein the offsetting step comprises forming the opposite end of the balance clip at; a radius that is less than a radius of the body of the balance clip.

8. The method of claim 6, wherein the offsetting step comprises forming the opposite end of the balance clip at a pre-determined lesser radial distance with respect to the body of the balance clip.

9. A method of balancing a disk pack in a hard disk drive, comprising:
   providing the hard disk drive with a motor hub, a balance clip holder in the motor hub having a radially inward-facing shoulder, and a balance clip seated in and expanded radially outward into the radially inward-facing shoulder of the balance clip holder;
   providing a bent tab extending radially inward on one end of the balance clip to facilitate the disk pack balancing process;
   offsetting an opposite end of the balance clip radially inward relative to a diameter of a body of the balance clip; and
   slidably moving the balance clip relative to the balance clip holder to adjustably balance the motor hub for smooth rotation during the disk pack balance process, such that the opposite end of the balance clip is free of contact with the outer diameter wall of the balance clip holder.

* * * * *

UNITED STATES PATENT AND TRADEMARK OFFICE
CERTIFICATE OF CORRECTION

| | | |
|---|---|---|
| PATENT NO. | : 7,024,755 B2 | Page 1 of 1 |
| APPLICATION NO. | : 10/650881 | |
| DATED | : April 11, 2006 | |
| INVENTOR(S) | : Ta-Chang Fu et al. | |

It is certified that error appears in the above-identified patent and that said Letters Patent is hereby corrected as shown below:

1. In Column 6, Claim 6, Line 2, please replace the word "bolder" and insert the word -- holder -- between the words "clip" and "in".

2. In column 6, Claim 6, Line 9, please replace the word "apposite" and insert the word -- opposite -- between the words "the" and "end".

3. In Column 6, Claim 7, Line 18, please remove the ":" after the word "at" between the words "clip" and "a".

Signed and Sealed this

Eighteenth Day of July, 2006

JON W. DUDAS
*Director of the United States Patent and Trademark Office*